(12) United States Patent
Hu et al.

(10) Patent No.: US 9,542,049 B2
(45) Date of Patent: Jan. 10, 2017

(54) TOUCH SENSING CIRCUIT AND METHOD, TOUCH SCREEN AND DISPLAY DEVICE (71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Zuquan Hu, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 50 days.

(21) Appl. No.: 14/415,696

(22) PCT Filed: Jun. 30, 2014

(86) PCT No.: PCT/CN2014/081201
§ 371 (c)(1),
(2) Date: Jan. 19, 2015

(87) PCT Pub. No.: WO2015/055022
PCT Pub. Date: Apr. 23, 2015

(65) Prior Publication Data
US 2016/0004364 A1 Jan. 7, 2016

(30) Foreign Application Priority Data
Oct. 14, 2013 (CN) .......................... 2013 1 0479112

(51) Int. Cl.
*G06F 3/044* (2006.01)
*G06F 3/041* (2006.01)
(Continued)

(52) U.S. Cl.
CPC ............... *G06F 3/044* (2013.01); *G06F 3/047* (2013.01); *G06F 3/0416* (2013.01);
(Continued)

(58) Field of Classification Search
CPC ............................... G06F 3/044; G06F 3/0416
See application file for complete search history.

(56) References Cited

U.S. PATENT DOCUMENTS 7,280,167 B2 * 10/2007 Choi ..................... G06F 3/0412
345/174
7,863,966 B1 * 1/2011 Chuang ................... G06F 3/044
327/517

(Continued)

FOREIGN PATENT DOCUMENTS

CN 101571780 A 11/2009
CN 101581845 A 11/2009

(Continued)

OTHER PUBLICATIONS

English translation of Written Opinion of the International Searching Authority for International Application No. PCT/CN2014/081201.

(Continued)

Primary Examiner — Sanjiv D Patel
(74) Attorney, Agent, or Firm — Nath, Goldberg & Meyer; Joshua B. Goldberg; Christopher Thomas (57) ABSTRACT The invention provides a touch sensing circuit and method, a touch screen and a display device, the touch sensing circuit comprises: a touch sensing unit, an output control unit and a detection unit; the touch sensing unit is configured for providing a touch current, and transmitting the touch current to the output control unit; the output control unit is connected with a second control line, a read-out line, the touch sensing unit and the detection unit, for outputting the touch (Continued)

current to the detection unit; the detection unit is connected with a reference voltage terminal, an output terminal, the read-out line and the output control unit, for detecting significant change in the voltage output by the output control unit, thereby determining the location where the touch occurs. The detection accuracy of the detection sensing circuit in determining the occurrence of touch is improved.

16 Claims, 6 Drawing Sheets

(51) Int. Cl.
*G06F 3/047* (2006.01)
*G09G 3/36* (2006.01)

(52) U.S. Cl.
CPC ... *G09G 3/3696* (2013.01); *G09G 2300/0426* (2013.01); *G09G 2310/08* (2013.01)

(56) References Cited

U.S. PATENT DOCUMENTS

| | | | | |
|---|---|---|---|---|
| 2005/0078856 | A1* | 4/2005 | Miyasaka | G06K 9/0002 382/124 |
| 2009/0115735 | A1* | 5/2009 | Chuang | G02F 1/13338 345/173 |
| 2009/0273578 | A1* | 11/2009 | Kanda | G06F 3/044 345/174 |
| 2010/0039406 | A1* | 2/2010 | Lee | G02F 1/13338 345/174 |
| 2010/0156819 | A1* | 6/2010 | Takahashi | G06F 3/044 345/173 |
| 2011/0037457 | A1* | 2/2011 | Chuang | G06F 3/0416 324/120 |
| 2012/0050220 | A1* | 3/2012 | Liu | G06F 3/044 345/174 |
| 2012/0133607 | A1* | 5/2012 | Chiu | G06F 3/041 345/174 |

FOREIGN PATENT DOCUMENTS

| | | |
|---|---|---|
| CN | 102096506 A | 6/2011 |
| CN | 102185604 A | 9/2011 |
| CN | 103500040 A | 1/2014 |
| CN | 203520352 U | 4/2014 |
| KR | 100991130 B1 | 11/2010 |

OTHER PUBLICATIONS

Office Action dated Nov. 3, 2015 in corresponding Chinese Application No. 201310479112.5.
Office Action dated Jan. 4, 2016 in corresponding Chinese Application No. 201310479112.5.
International Search Report in International Application No. PCT/CN2014/081201.

* cited by examiner

TOUCH SENSING CIRCUIT AND METHOD, TOUCH SCREEN AND DISPLAY DEVICE

This is a National Phase Application filed under 35 U.S.C. 371 as a national stage of PCT/CN2014/081201, filed Jun. 30, 2014, an application claiming the benefit of Chinese Application No. 201310479112.5, filed Oct. 14, 2013, the content of each of which is hereby incorporated by reference in its entirety.

FIELD OF THE INVENTION

The present invention relates to the technical field of touch screen, and particularly to a touch sensing circuit and method thereof, touch screen and display device.

BACKGROUND OF THE INVENTION

LCD display screen has been widely used in various display fields, such as home, public places, offices and personal electronics-related products. As people's increasing demand for display, touch operation has been used more and more widely. Touch screen is usually implemented as resistive, capacitive, optical, acoustic wave, etc., in which the capacitor is embedded in the touch screen, i.e., the embedded capacitive touch manner can make the touch screen to be thinner, lighter than the touch screen of other touch manner, and save more cost, and therefore the embedded capacitive touch screen draws more and more attention.

Figure 1:
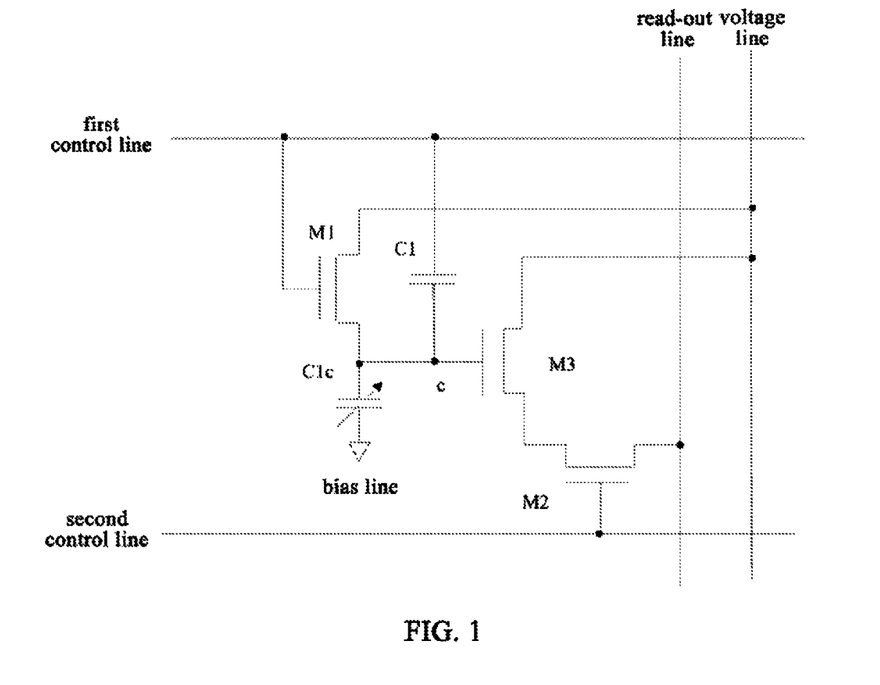
FIG. 1 is a schematic structural view of a touch sensing circuit in the prior art.

FIG. 1 is an embedded capacitive touch sensing circuit in the prior art, as shown in FIG. 1, the circuit comprises: a first transistor M1, a second transistor M2, an amplification transistor M3, a fixed capacitor C1 and an variable capacitor C1c, wherein the gate of the first transistor M1 is connected to the first control line, the source of the first transistor M1 is connected to the voltage line, the drain of the first transistor M1 is connected to the node c, the first transistor M1 is used to implement the initialization process. One terminal of the fixed capacitor C1 is connected to the first control line, and the other terminal of the fixed capacitance C1 is connected to the node c, so as to hold the gate-drain voltage of the first transistor M1. One terminal of the variable capacitor C1c is connected to the node c, the other terminal of the variable capacitor C1c is connected to the bias line. The gate of the amplification transistor M3 is connected to the node c, the source of the amplification transistor M3 is connected to the voltage line, the drain of the amplification transistor M3 is connected to the source of the second transistor M2; the gate of the second transistor M2 is connected to the second control line, the drain of the second transistor M2 is connected to the read-out line. The operation of the circuit is as follows.

When the first control line is applied with high level, the first transistor M1 is turned on, the fixed capacitor C1 and the variable capacitor C1c are charged, the node c is charged to V1; when the first control line is applied with low level, due to the capacitive coupling effects, the voltage on node c becomes: $Vc=V1-C1*\Delta Vp/(C1+C1c)$, wherein $\Delta Vp$ is the difference value between the pulse high voltage and low voltage on the first control line. When a touch occurs, the variable capacitance C1c changes, the node voltage Vc is changed, resulting in a change in the gate voltage of the amplification transistor M3, thereby the source current flowing through the amplification transistor M3 is changed, i.e. the source current from the amplification transistor M3 to the second transistor M2 is changed. When the second control line is applied with high level, the second transistor M2 is turned on, the current from the drain of the second transistor M2 to the read-out line is changed, and the changed current is detected by the detection unit connected with the read-out line, such that a detection of the touch location and subsequent operations can be performed.

Those problems exist in the prior art: compared to the Vc value when no touch occurs, the change in Vc value generated by change of the variable capacitor C1c when a touch occurs is relative small, change in the current flowing through the amplification transistor M3 and the second transistor M2 to the read-out line is small, such that the accuracy of the touch sensing circuit in determining the occurrence of touch is not satisfactory.

SUMMARY OF THE INVENTION

The present invention provides a touch sensing circuit and method, a touch screen and a display device, which can improve accuracy of the touch sensing circuit in determining the occurrence of touch.

To achieve the above object, the present invention provides a touch sensing circuit, comprising: a touch sensing unit, an output control unit and a detection unit;

the touch sensing unit is connected with a first control line, a first power source, a second power source, and the output control unit, for providing a touch current, and the touch current is transmitted to the output control unit;

the output control unit is connected with a second control line, a read-out line, the touch sensing unit and the detection unit, for outputting the touch current to the detection unit through the read-out line;

the detection unit is connected with a reference voltage terminal, an output terminal, the read-out line and the output control unit, for detecting significant change in a voltage output by the output control unit, thereby determining a location where a touch occurs.

Preferably, the touch sensing unit is also connected to a signal line, and the touch sensing unit comprises: a first transistor, a second transistor, a touch electrode, a first capacitor, a second capacitor;

a control electrode of the first transistor is connected to the first control line, a first electrode of the first transistor is connected to the signal line, a second electrode of the first transistor is connected to a first terminal of the first capacitor;

a control electrode of the second transistor is connected to the touch electrode, a first electrode of the second transistor is connected to the first power source, a second electrode of the second transistor is connected to the output control unit;

a second terminal of the first capacitor is connected to the touch electrode;

a first terminal of the second capacitor is connected to the touch electrode, the second terminal of the second capacitor is connected to the second power source.

Preferably, the touch sensing unit comprises: a first transistor, a second transistor, a touch electrode, a first capacitor, a second capacitor;

a control electrode and a first electrode of the first transistor are both connected to the first control line, a second electrode of the first transistor is connected to a first terminal of the first capacitor;

a control electrode of the second transistor is connected to the touch electrode, a first electrode of the second transistor is connected to the first power source, a second electrode of the second transistor is connected to the output control unit;

a second terminal of the first capacitor is connected to the touch electrode;

a first terminal of the second capacitor is connected to the touch electrode, the second terminal of the second capacitor is connected to the second power source.

Preferably, the second capacitor is a variable capacitor a capacitance of which is changed upon occurrence of touch, and the capacitance value of the second capacitor is much larger than that of the first capacitor when the touch occurs.

Preferably, the output control unit comprises: a third transistor;

a control electrode of the third transistor is connected to the second control line, a first electrode of the third transistor is connected to a second electrode of the second transistor, a second electrode of the third transistor is connected to the read-out line.

Preferably, the detection unit comprises: a third capacitor, a switch unit and an amplifier;

the third capacitor and the switch unit are parallel connected between an output terminal and a first terminal of the amplifier, a second terminal of the amplifier is connected to the reference voltage terminal.

Preferably, when the switch unit is turned on, the third capacitor is charged by the touch current, a voltage across the third capacitor is changed and forms a voltage difference with the reference voltage terminal, thereby the location of touch is determined; when the switch unit is turned off, the third capacitor is discharged and reset.

Preferably, the first transistor, the second transistor and the third transistor are N-type thin film transistors.

To achieve the above object, the present invention provides a touch screen including the above-mentioned touch sensing circuit.

To achieve the above object, the present invention provides a display device including the above-mentioned touch screen.

To achieve the above object, the present invention provides a touch sensing method implemented by a touch sensing circuit, the touch sensing circuit comprising: a touch sensing unit, an output control unit and a detection unit; the touch sensing method comprising steps of:

providing touch current by the touch sensing unit under control of a first control line, a first power source and a second power source, and transmitting the touch current to the output control unit;

outputting the touch current to the detection unit through the read-out line, by the output control unit under control of a second control line;

under control of the reference voltage terminal, detecting significant change in the voltage output from the output control unit by the detection unit through the read-out line, thereby determining a location where a touch occurs.

Preferably, the touch unit comprises: a first transistor, a second transistor, a touch electrode, a first capacitor, a second capacitor;

the step of providing touch current by the touch sensing unit under control of a first control line, a first power source and a second power source, and transmitting the touch current to the output control unit comprises:

the first transistor and the second transistor are turned on under control of the first control line, the first capacitor and the second capacitor are controlled by a first power source and a second power source to change a voltage value of the touch electrode, so that a control voltage of the second transistor is changed and touch current is generated.

Preferably, the output control unit comprises a third transistor, the step of outputting the touch current to the detection unit through the read-out line, by the output control unit under control of a second control line comprises:

a third transistor is turned on under control of the second control line, the touch current flowing through the second transistor is transmitted to the read-out line through the third transistor.

Preferably, the detection unit comprises: a third capacitor, a switch unit and an amplifier, the third capacitor and the switch unit are parallel connected between an output terminal and a positive input terminal of the amplifier, a negative input electrode of the amplifier is connected to the reference voltage terminal;

the step of determining a location of touch by the detection unit through the read-out line under control of the reference voltage terminal comprises:

when the switch unit is turned on, the third capacitor is charged by the touch current output from the output control unit, a voltage across the third capacitor is changed and forms a voltage difference with the reference voltage terminal, the voltage difference is amplified by the amplifier, thereby outputting signal indicating the location of touch; when the switch unit is turned off, the third capacitor is discharged and reset.

According to the touch sensing circuit and method thereof, touch screen and display device of the present invention, by providing the detection unit, the sensitivity to the touch output signal is improved, and the location of touch can be detected by determination of the detection unit. Further, by providing the first transistor, the first capacitor and the second capacitor connected in series in the touch sensing unit, the voltage division function is mainly implemented by the first capacitor and the second capacitor connected in series, and the gate voltage of the second transistor can be further controlled; when a touch occurs, the gate voltage of the second transistor is changed, the output voltage on the output terminal is much smaller as compared to the case where no touch occurs, such that the detection accuracy of the detection sensing circuit in determining the occurrence of touch is improved.

DETAILED DESCRIPTION OF THE EMBODIMENTS

To make the person skilled in the art understand the technical solution of the present invention better, the touch sensing circuit and method thereof, touch screen and display device of the present invention are further described below in details in conjunction with the accompanying drawings.

Figure 2:
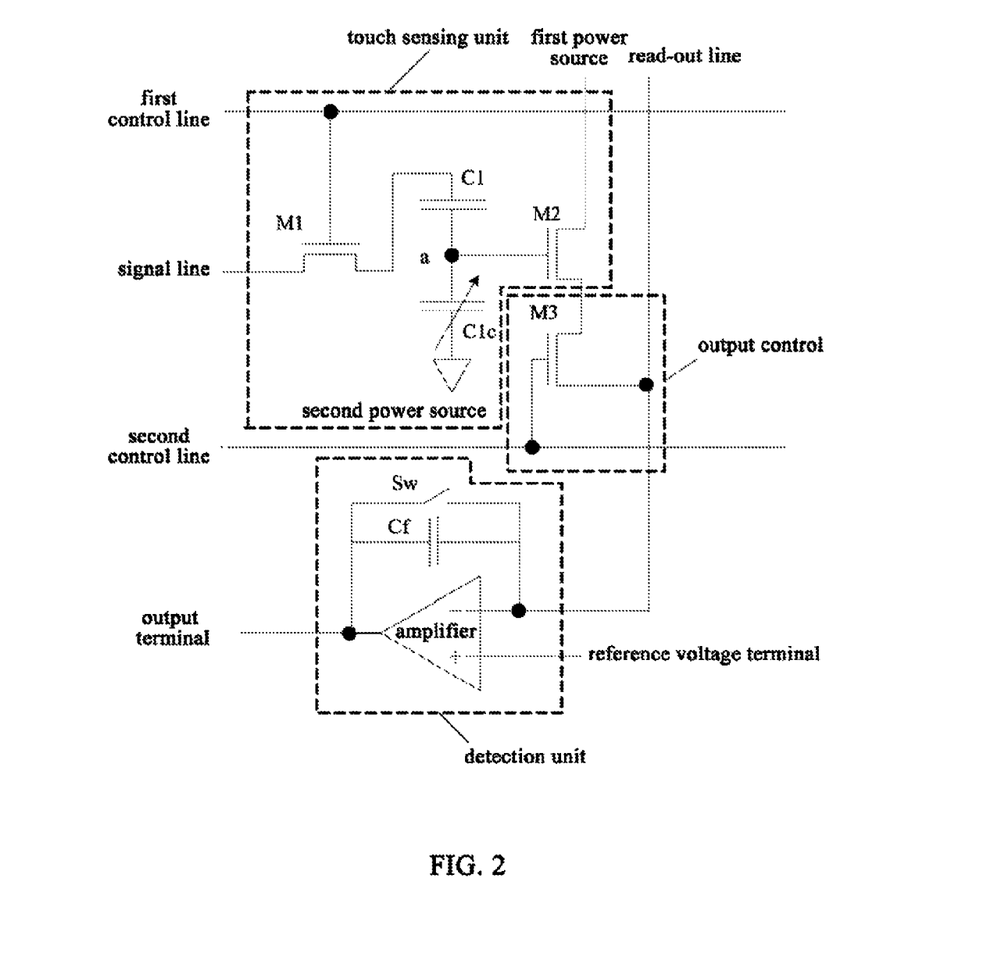
FIG. 2 is a schematic structural view of the touch sensing circuit provided in a first embodiment of the present invention.

FIG. 2 is a schematic structural view of the touch sensing circuit provided in the first embodiment of the present invention. As shown in FIG. 2, the touch sensing circuit comprises: a touch sensing unit, an output control unit and a detection unit; the touch sensing unit is connected with a first control line, a signal line, a first power source, and a second power source; the output control unit is connected with a second control line and a read-out line; the detection unit is connected with a reference voltage terminal and the read-out line; the touch sensing unit is used for providing a touch current, and transmitting the touch current to the output control unit; the output control unit is used for outputting the touch current to the detection unit through the read-out line; and the detection unit is used for detecting significant change in the voltage output by the output control unit, thereby determining the location where the touch occurs.

Note that in the present embodiment of the invention, the first transistor M1, the second transistor M2 and the third transistor M3 are N-type thin film transistors. In the transistors, the control electrode is considered as the gate transistor, a first electrode and a second electrode are considered as the source and drain electrodes, the first electrode and the second electrode have the same structure. In practice, depending on the location and function of a transistor in the circuit, the first electrode may be the source and the second electrode may be the drain; otherwise, the first electrode may be the drain and the second electrode may be the source. In the drawings, it is specified that the middle terminal of the transistor is the gate, the signal input terminal is the source, and the signal output terminal is the drain. The first power source provides a high level VDD, the second power source provides a voltage with a fixed level Vcom, and the voltage supplied by the reference voltage terminal is a reference voltage Vref. The N-type transistor in the embodiments of the present invention is turned on by high level on the gate and turned off by low level on the gate.

Preferably, the touch sensing unit comprises: a first transistor M1, a second transistor M2, a touch electrode a, a first capacitor C1, a second capacitor C1c; the gate electrode of the first transistor M1 is connected to the first control line, a first electrode of the first transistor M1 is connected to the signal line, a second electrode of the first transistor M1 is connected to a first terminal of the first capacitor C1; the gate electrode of the second transistor M2 is connected to the touch electrode a, a first electrode of the second transistor M2 is connected to the first power source, a second electrode of the second transistor M2 is connected to the output control unit; a second terminal of the first capacitor C1 is connected to the touch electrode a; a first terminal of the second capacitor C1c is connected to the touch electrode a, the second terminal of the second capacitor C1c is connected to the second power source.

Preferably, the output control unit comprises: a third transistor M3; the gate electrode of the third transistor M3 is connected to the second control line, a first electrode of the third transistor M3 is connected to a second electrode of the second transistor M2, a second electrode of the third transistor M3 is connected to the read-out line.

Preferably, the detection unit comprises: a third capacitor Cf, a switch unit Sw and an amplifier; the third capacitor Cf and the switch unit Sw are parallel connected between an output terminal and a first terminal of the amplifier, a second terminal of the amplifier is connected to the reference voltage terminal. When the switch unit Sw is turned on, the third capacitor Cf is charged by the touch current output from the output control unit, the voltage across the third capacitor Cf is changed and forms a voltage difference with the reference voltage terminal Vref, thereby the location of touch is determined; when the switch unit Sw is turned off, the third capacitor Cf is discharged and reset. The amplifier is used for amplifying the voltage difference between the third capacitor Cf and the reference voltage terminal Vref, so as to improve the detection accuracy.

Hereinafter the operation of the touch sensing circuit according to the first embodiment of the present invention will be described with reference to FIGS. 2-4.

Figure 3:
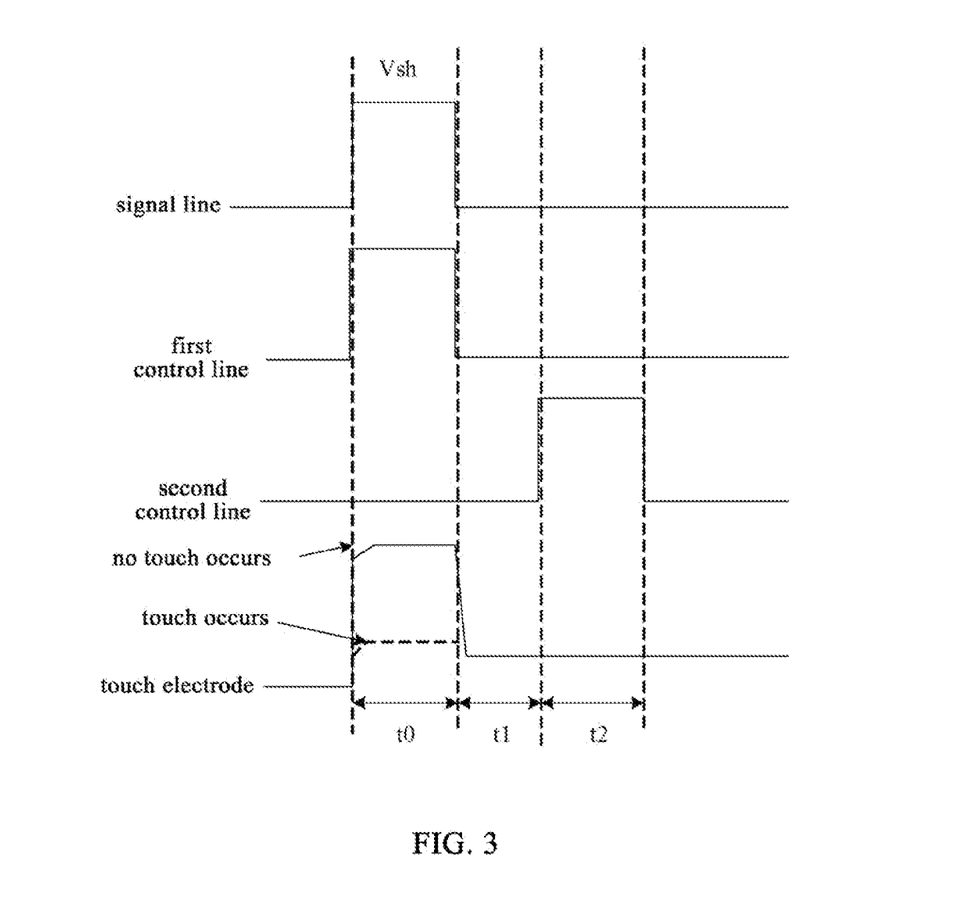
FIG. 3 is a timing chart of the operation of the touch sensing circuit according to the first embodiment.

FIG. 3 is a timing chart of the operation of the touch sensing circuit according to the first embodiment; as shown in FIGS. 2 and 3, at time in the period t0, a high level is applied to the first control line, the signal line is also applied with a high level, the first transistor M1 is turned on, the first capacitor C1 is charged to a high level Vsh, the second terminal of the second capacitor C1c is connected to the second power source, the second power source provides a voltage with a fixed level Vcom, the first capacitor C1 and the second capacitance C1c are connected in series, therefore, voltage on the touch electrode a becomes: Va=Vcom+C1*(Vsh−Vcom)/(C1+C1c), wherein, since Vcom, Vsh and VC1 are temporarily fixed values, and the second capacitor C1c is a variable capacitor which can be changed due to user's touch action, the voltage on the touch electrode a may be changed by changing the capacitance of the second capacitor C1c through a touch. In practice, in order to cause significant change in the voltage on the touch electrode a when a touch occurs as compared to the case where no touch occurs, it can be designed as follows:

When no touch occurs, making $C1 \approx C1c$, at this time, the voltage on the touch electrode a is:

$$Va \approx (Vsh + Vcom)/2 \qquad (1)$$

When a touch occurs, the second capacitor C1c is increased, and $C1 \ll C1c$ is satisfied, in this case, the voltage on the touch electrode a becomes:

$$Va \approx Vcom \qquad (2)$$

At the same time, the value of Vsh and Vcom can be set as Vcom≪Vsh. As can be seen from above formulas (1) and (2), voltage on the touch electrode a when a touch occurs is much smaller than the voltage when no touch occurs.

As shown in FIG. 3, in the period t0, the voltage on the touch electrode a when a touch occurs is much smaller than the voltage on the touch electrode a when no touch occurs. The control electrode voltage of the second transistor M2 connected to the touch electrode a will change, and the current flowing through the second electrode of the second transistor M2 will change accordingly. That is, when a touch occurs, the current flowing through the second electrode of the second transistor M2 is much smaller than that when no touch occurs. In the period t1, the first control line, the second control line and the signal line are applied with a low level, at this time, the touch electrode a is in a low level state. In the period t2, the second control line is applied with a high level, the third transistor M3 connected with the second control line is turned on, at this time, the current from the second electrode of the second transistor M2 flows via the third transistor M3 to the read-out line, the read-out line is connected with the detection unit, and thus the touch location can be detected by the detection unit.

Figure 4:
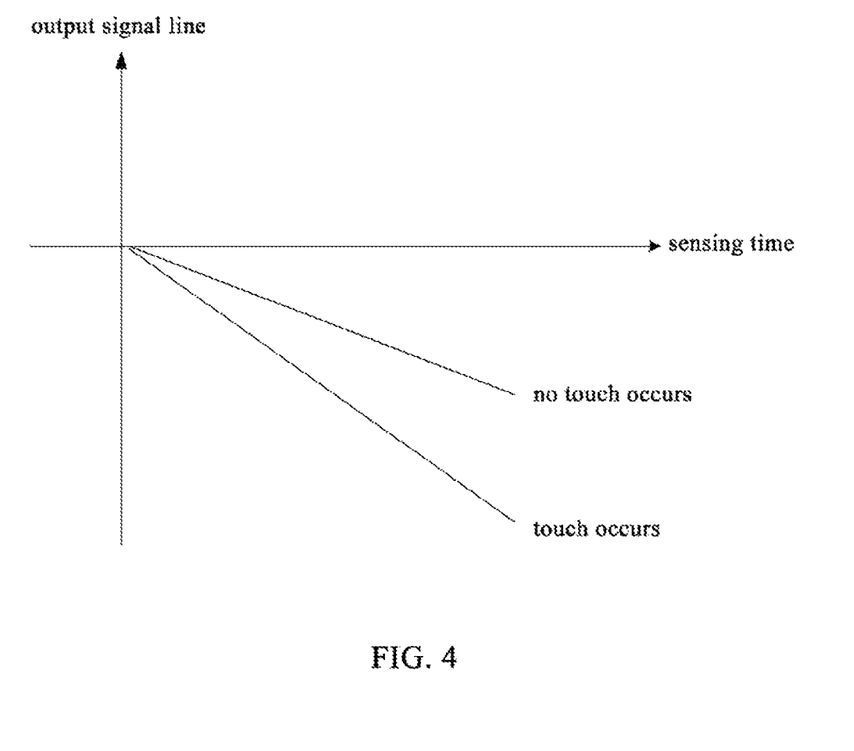
FIG. 4 is a schematic view showing the comparison of the output voltage of the touch sensing circuit when there is a touch or no touch occurs in a period.

FIG. 4 is a schematic view showing the comparison of the output voltages of the touch sensing circuit when there is a touch and when no touch occurs in a period. As shown in FIG. 4, compared to the case where no touch occurs, the output voltage value is changed when a touch occurs in one period. In order to cause rapid change of the voltage on the touch electrode a when a touch occurs as compared to the case where no touch occurs, it can be designed as follows:

When no touch occurs, making C1≈C1c, at this time, the voltage on the touch electrode a is:

$$Va \approx (Vsh+Vcom)/2 \qquad (1)$$

When a touch occurs, the second capacitor C1c is increased, and C1<<C1c is satisfied. In this case, the voltage on the touch electrode a becomes:

$$Va \approx Vcom \qquad (2)$$

At the same time, the value of Vsh and Vcom can be set as Vcom<<Vsh. As can be seen from above formulas (1) and (2), voltage on the touch electrode a when a touch occurs is much smaller than the voltage when no touch occurs. Since the second capacitor C1c becomes much larger than C1 when a touch occurs, the charging time of the capacitor is extended, the voltage on the touch electrode a when a touch occurs varies much slowly than the variation of the voltage on the touch electrode a when no touch occurs. The final output voltage when a touch occurs is much smaller than that when no touch occurs.

When a touch occurs, the control electrode voltage of the second transistor M2 connected to the touch electrode a will change, that is, the gate voltage of the second transistor M2 changes under control of the touch electrode a, and the current flowing through the second electrode of the second transistor M2 will change accordingly. Meanwhile, when a touch occurs, the current flowing through the second electrode of the second transistor M2 is much smaller than that when no touch occurs. When the third transistor M3 is turned on, the current output from second transistor M2 to the third transistor M3 will change significantly, the changed current is output by the third transistor M3 to the read-out line, the significant change in the output voltage is detected by the detection unit connected with the read-out line, and the touch location can be detected more precisely.

In the present embodiment, by providing the first transistor M1, the first capacitor C1 and the second capacitor C1c connected in series in the touch sensing unit, the voltage division function is implemented by the first capacitor C1 and the second capacitor C1c connected in series, and the gate voltage of the second transistor M2 can be controlled; the change in the gate voltage of the second transistor M2 will change the output current of the second transistor M2. By turning on the third transistor M3, the changed current flows through the read-out line. Depending on the significant change in the output voltage on the output terminal, the touch location can be determined accurately by the detection unit connected with the read-out line.

According to the present embodiment, the touch sensing circuit comprises: a touch sensing unit, an output control unit and a detection unit; the touch sensing unit is connected with a first control line, a first power source, a second power source, and the output control unit, for providing a touch current, and the touch current is transmitted to the output control unit; the output control unit is connected with a second control line, a read-out line, the touch sensing unit and the detection unit, for outputting the touch current to the detection unit through the read-out line; the detection unit is connected with a reference voltage terminal, an output terminal, the read-out line and the output control unit, for detecting significant change in the voltage output by the output control unit, thereby determining the location where the touch occurs. By providing the detection unit, the sensitivity to the touch output signal is improved, and the location of touch can be detected by determination of the detection unit. Further, by providing the first transistor, the first capacitor and the second capacitor connected in series in the touch sensing unit, the voltage division function is mainly implemented by the first capacitor and the second capacitor connected in series, and the gate voltage of the second transistor can be further controlled; when a touch occurs, the gate voltage of the second transistor is changed. The output voltage on the output terminal is much smaller as compared to the case where no touch occurs, such that the detection accuracy of the detection sensing circuit in determining the occurrence of touch is improved.

Figure 5:
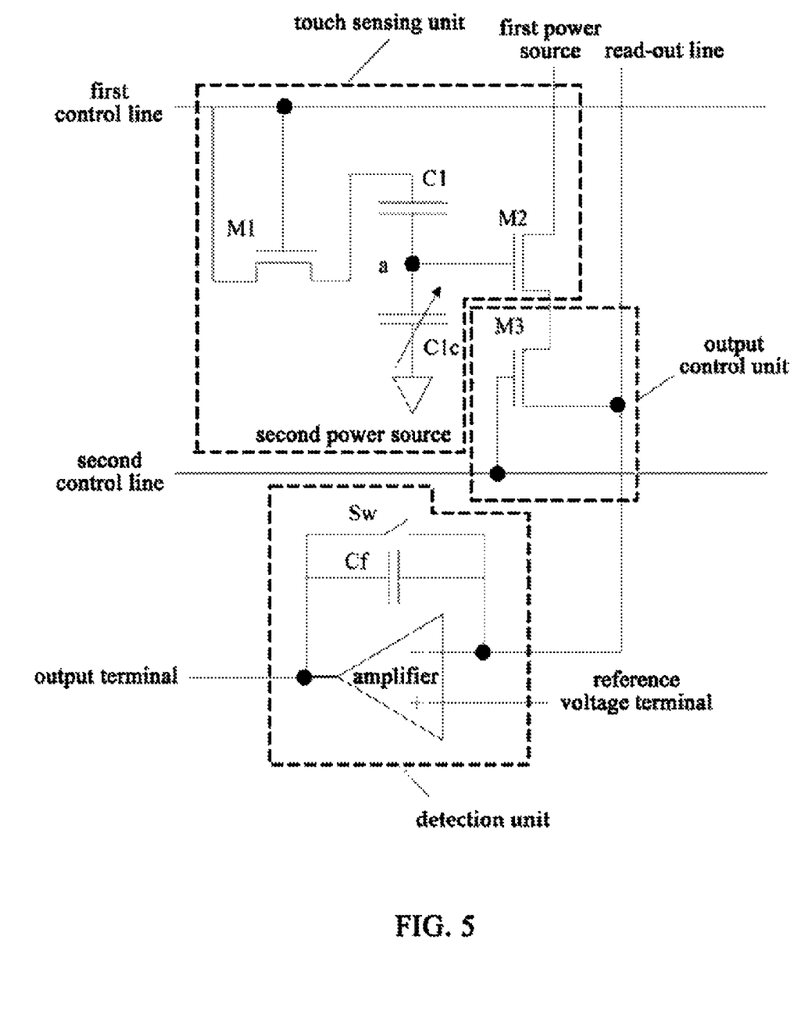
FIG. 5 is a schematic structural view of the touch sensing circuit provided in a second embodiment of the present invention.

FIG. 5 is a schematic structural view of the touch sensing circuit provided in the second embodiment of the present invention. As shown in FIG. 5, the touch sensing circuit comprises: a touch sensing unit, an output control unit and a detection unit; the touch sensing unit is connected with a first control line, a first power source, and a second power source, the output control unit is connected with a second control line and a read-out line; the detection unit is connected with a reference voltage terminal and the read-out line; the touch sensing unit is used for providing a touch current, and the touch current is transmitted to the output control unit; the output control unit outputs the touch current to the detection unit through the read-out line; the detection unit detects the touch location.

The second embodiment is different from the first embodiment in that: the first electrode of the first transistor M1 is connected to the first control line, thus the signal line can be omitted and the circuit is simplified.

The touch sensing circuit of the present embodiment operates in a same manner as that of the first embodiment, the detail implementation is described in the first embodiment and is not repeated here.

In the touch sensing circuit of the present embodiment, by providing the detection unit, the sensitivity to the touch output signal is improved, and the location of touch can be detected by determination of the detection unit. Further, by providing the first transistor, the first capacitor and the second capacitor connected in series in the touch sensing unit, the voltage division function is mainly implemented by the first capacitor and the second capacitor connected in series, and the gate voltage of the second transistor can be further controlled; when a touch occurs, the gate voltage of the second transistor is changed. The output voltage on the output terminal is much smaller as compared to the case where no touch occurs, such that the detection accuracy of the touch sensing circuit in determining the occurrence of touch is improved.

The third embodiment of the present invention provides a touch screen comprising: a touch sensing circuit, the touch sensing circuit comprises: a touch sensing unit, an output control unit and a detection unit; the touch sensing unit is connected with a first control line, a first power source, and a second power source, the output control unit is connected with a second control line and a read-out line; the detection unit is connected with a reference voltage terminal and the read-out line; the touch sensing unit is used for providing a touch current, and the touch current is transmitted to the output control unit; the output control unit outputs the touch current to the detection unit through the read-out line; the detection unit detects the touch location.

The touch sensing circuit of the first or second embodiment is utilized in the touch screen of the present embodiment, the detail implementation is described in the first or second embodiment and is not repeated here.

In the touch screen of the present embodiment, by providing the detection unit, the sensitivity to the touch output signal is improved, and the location of touch can be detected by determination of the detection unit. Further, by providing the first transistor, the first capacitor and the second capacitor connected in series in the touch sensing unit, the voltage division function is mainly implemented by the first capacitor and the second capacitor connected in series, and the gate voltage of the second transistor can be further controlled; when a touch occurs, the gate voltage of the second transistor is changed. The output voltage on the output terminal is much smaller as compared to the case where no touch occurs, such that the detection accuracy of the detection sensing circuit in determining the occurrence of touch is improved.

The fourth embodiment of the present invention provides a display device comprising a touch screen, the touch screen comprises a touch sensing circuit, the touch sensing circuit comprises: a touch sensing unit, an output control unit and a detection unit; the touch sensing unit is connected with a first control line, a first power source, and a second power source, the output control unit is connected with a second control line and a read-out line; the detection unit is connected with a reference voltage terminal and the read-out line; the touch sensing unit is used for providing a touch current, and the touch current is transmitted to the output control unit; the output control unit outputs the touch current to the detection unit through the read-out line; the detection unit detects the touch location.

The touch sensing circuit of the first or second embodiment is utilized in the display device of the present embodiment, the detail implementation is described in the first or second embodiment and is not repeated here.

In the display device of the present embodiment, by providing the detection unit, the sensitivity to the touch output signal is improved, and the location of touch can be detected by determination of the detection unit. Further, by providing the first transistor, the first capacitor and the second capacitor connected in series in the touch sensing unit, the voltage division function is mainly implemented by the first capacitor and the second capacitor connected in series, and the gate voltage of the second transistor can be further controlled; when a touch occurs, the gate voltage of the second transistor is changed. The output voltage on the output terminal is much smaller as compared to the case where no touch occurs, such that the detection accuracy of the detection sensing circuit in determining the occurrence of touch is improved.

Figure 6:
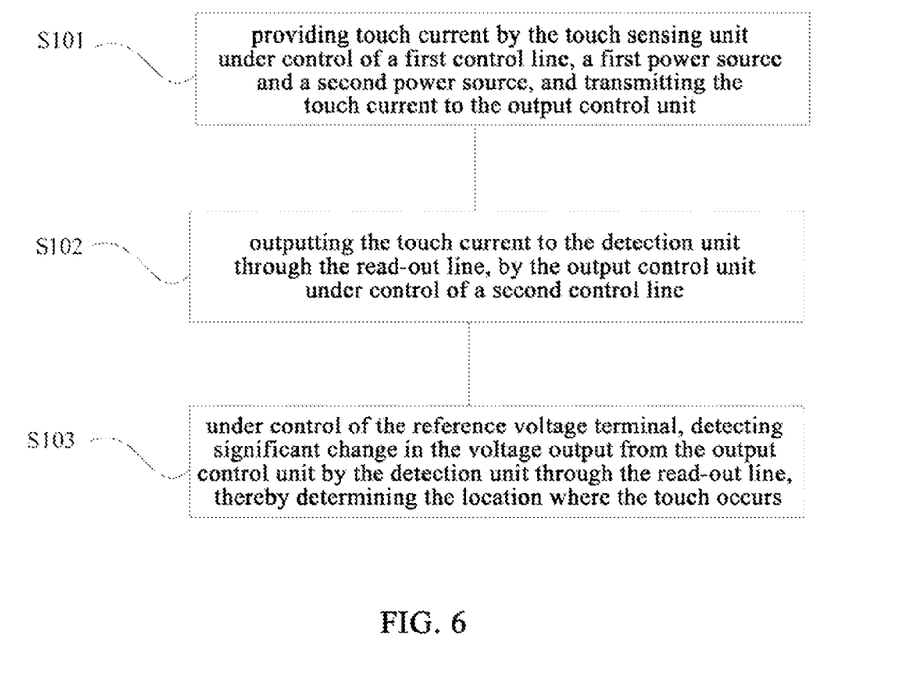
FIG. 6 is a flowchart of a touch sensing method according to a fifth embodiment of the present invention.

FIG. 6 is a flowchart of a touch sensing method according to the fifth embodiment of the present invention. As shown in FIG. 6, the touch sensing method is implemented by a touch sensing circuit, the touch sensing circuit comprising: a touch sensing unit, an output control unit and a detection unit; the touch sensing method comprising:

step S101, providing touch current by the touch sensing unit under control of a first control line, a first power source and a second power source, and transmitting the touch current to the output control unit.

Preferably, the touch unit comprises: a first transistor, a second transistor, a touch electrode, a first capacitor, a second capacitor;

the step of providing touch current by the touch sensing unit under control of a first control line, a first power source and a second power source, and transmitting the touch current to the output control unit comprises:

the first transistor and the second transistor are turned on under control of the first control line, the first capacitor and the second capacitor are controlled by a first power source and a second power source to change the voltage value of the touch electrode, so that the control electrode voltage of the second transistor is changed and touch current is generated.

Step S102, outputting the touch current to the detection unit through the read-out line, by the output control unit under control of a second control line.

Preferably, the output control unit comprises a third transistor, the step of outputting the touch current to the detection unit through the read-out line, by the output control unit under control of a second control line comprises:

a third transistor is turned on under control of the second control line, the touch current flowing through the second transistor is transmitted to the read-out line through the third transistor.

Step S103, under control of the reference voltage terminal, detecting significant change in the voltage output from the output control unit by the detection unit through the read-out line, thereby determining the location where the touch occurs.

Preferably, the detection unit comprises: a third capacitor, a switch unit and an amplifier, the third capacitor and the switch unit are parallel connected between the output terminal and the positive input terminal of the amplifier, the negative input electrode of the amplifier is connected to the reference voltage terminal;

the step of determining the location of touch by the detection unit through the read-out line under control of the reference voltage terminal comprises:

when the switch unit is turned on, the third capacitor is charged by the touch current output from the output control unit, the voltage across the third capacitor is changed and forms a voltage difference with the reference voltage terminal, the voltage difference is amplified by the amplifier, thereby outputting signal indicating the location of touch; when the switch unit is turned off, the third capacitor is discharged and reset.

It should be understood that the above embodiments are only exemplary embodiments for illustrating the principle of the present invention; however, the present invention is not limited thereto. Various variations and improvements can be made by the person skilled in the art without departing from the spirit and essence of the present invention, and these variations and improvements should also be considered to be within the protection scope of the present invention.

The invention claimed is:

1. A touch sensing circuit, comprising: a touch sensing unit, an output control unit and a detection unit;
    the touch sensing unit is connected with a first control line, a first power source, a second power source and the output control unit, for providing a touch current, and the touch current is transmitted to the output control unit;
    the output control unit is connected with a second control line, a read-out line, the touch sensing unit and the detection unit, for outputting the touch current to the detection unit through the read-out line;
    the detection unit is connected with a reference voltage terminal, an output terminal, the read-out line and the output control unit, for detecting significant change in a voltage output by the output control unit, thereby determining a location where a touch occurs, wherein
    the touch sensing unit comprises: a first transistor, a second transistor, a touch electrode, a first capacitor, and a second capacitor;

a second electrode of the first transistor is connected to a first terminal of the first capacitor;

a control electrode of the second transistor is connected to the touch electrode, a first electrode of the second transistor is connected to the first power source, and a second electrode of the second transistor is connected to the output control unit;

a second terminal of the first capacitor is connected to the touch electrode; and a first terminal of the second capacitor is connected to the touch electrode, and a second terminal of the second capacitor is connected to the second power source.

2. The touch sensing circuit according to claim 1, wherein the touch sensing unit is also connected to a signal line, and a control electrode of the first transistor is connected to the first control line, a first electrode of the first transistor is connected to the signal line, a second electrode of the first transistor is connected to a first terminal of the first capacitor.

3. The touch sensing circuit according to claim 1, wherein a control electrode and a first electrode of the first transistor are both connected to the first control line, a second electrode of the first transistor is connected to a first terminal of the first capacitor.

4. The touch sensing circuit according to claim 2, wherein the second capacitor is a variable capacitor a capacitance of which is changed upon occurrence of touch, and the capacitance of the second capacitor is much larger than that of the first capacitor when a touch occurs.

5. The touch sensing circuit according to claim 3, wherein the second capacitor is a variable capacitor a capacitance of which is changed upon occurrence of touch, and the capacitance of the second capacitor is much larger than that of the first capacitor when a touch occurs.

6. The touch sensing circuit according to claim 2, wherein the output control unit comprises: a third transistor;

a control electrode of the third transistor is connected to the second control line, a first electrode of the third transistor is connected to the second electrode of the second transistor, a second electrode of the third transistor is connected to the read-out line.

7. The touch sensing circuit according to claim 3 wherein the output control unit comprises: a third transistor;

a control electrode of the third transistor is connected to the second control line, a first electrode of the third transistor is connected to the second electrode of the second transistor, a second electrode of the third transistor is connected to the read-out line.

8. The touch sensing circuit according to claim 6, wherein the detection unit comprises: a third capacitor, a switch unit and an amplifier;

the third capacitor and the switch unit are parallel connected between an output terminal and a first terminal of the amplifier, a second terminal of the amplifier is connected to the reference voltage terminal.

9. The touch sensing circuit according to claim 7, wherein the detection unit comprises: a third capacitor, a switch unit and an amplifier;

the third capacitor and the switch unit are parallel connected between an output terminal and a first terminal of the amplifier, a second terminal of the amplifier is connected to the reference voltage terminal.

10. The touch sensing circuit according to claim 8, wherein the first transistor, the second transistor and the third transistor are N-type thin film transistors.

11. The touch sensing circuit according to claim 9, wherein the first transistor, the second transistor and the third transistor are N-type thin film transistors.

12. A display device comprising a touch screen, wherein the touch screen comprising the touch sensing circuit according to claim 1.

13. A touch sensing method applied in a touch sensing circuit comprising:

a touch sensing unit, an output control unit and a detection unit;

the touch sensing unit is connected with a first control line, a first power source, a second power source and the output control unit, for providing a touch current, and the touch current is transmitted to the output control unit;

the output control unit is connected with a second control line, a read-out line, the touch sensing unit and the detection unit, for outputting the touch current to the detection unit through the read-out line;

the detection unit is connected with a reference voltage terminal, an output terminal, the read-out line and the output control unit, for detecting significant change in a voltage output by the output control unit, thereby determining a location where a touch occurs, wherein the touch sensing unit comprises: a first transistor, a second transistor, a touch electrode, a first capacitor, and a second capacitor;

a second electrode of the first transistor is connected to a first terminal of the first capacitor;

a control electrode of the second transistor is connected to the touch electrode, a first electrode of the second transistor is connected to the first power source, and a second electrode of the second transistor is connected to the output control unit;

a second terminal of the first capacitor is connected to the touch electrode; and a first terminal of the second capacitor is connected to the touch electrode, and a second terminal of the second capacitor is connected to the second power source, the touch sensing method comprising steps of:

providing touch current by the touch sensing unit under control of a first control line, a first power source and a second power source, and transmitting the touch current to the output control unit;

outputting the touch current to the detection unit through the read-out line, by the output control unit under control of a second control line;

under control of the reference voltage terminal, detecting significant change in the voltage output from the output control unit by the detection unit through the read-out line, thereby determining the location where the touch occurs.

14. The touch sensing method according to claim 13, wherein the step of providing touch current by the touch sensing unit under control of a first control line, a first power source and a second power source, and transmitting the touch current to the output control unit comprises:

the first transistor and the second transistor are turned on under control of the first control line, a voltage value of the touch electrode is changed when a touch occurs, so that a control electrode voltage of the second transistor is changed and touch current is generated.

15. The touch sensing method according to claim 14, wherein the step of outputting the touch current to the detection unit through the read-out line, by the output control unit under control of a second control line comprises:
    the third transistor is turned on under control of the second control line, the touch current flowing through the second transistor is transmitted to the read-out line through the third transistor.

16. The touch sensing method according to claim 14, wherein the step of determining the location of touch by the detection unit through the read-out line under control of the reference voltage terminal comprises:
    when the switch unit is turned on, the third capacitor is charged by the touch current output from the output control unit, a voltage across the third capacitor is changed and forms a voltage difference with the reference voltage terminal, the voltage difference is amplified by the amplifier, thereby outputting signal indicating the location of touch; when the switch unit is turned off, the third capacitor is discharged and reset.

* * * * *